(12) United States Patent
Zhadanov et al.

(10) Patent No.: US 7,527,231 B2
(45) Date of Patent: May 5, 2009

(54) DEVICE FOR HOLDING SHOWER ACCESSORIES

(76) Inventors: Eli Zhadanov, 2944 W. 5th St., Apt. 20J, Brooklyn, NY (US) 11224; Sam Zhadanov, 2942 W. 5th St., Brooklyn, NY (US) 11214

( * ) Notice: Subject to any disclaimer, the term of this patent is extended or adjusted under 35 U.S.C. 154(b) by 1454 days.

(21) Appl. No.: 10/053,614

(22) Filed: Jan. 24, 2002

(65) Prior Publication Data

US 2002/0125392 A1 Sep. 12, 2002

(51) Int. Cl.
*A45D 41/14* (2006.01)
(52) U.S. Cl. .............. 248/206.2; 248/251; 248/316.7
(58) Field of Classification Search .............. 248/251, 248/254, 255, 262, 263, 264, 267, 268, 271, 248/292.14, 222.51, 222.52, 75, 316.7, 205.5, 248/206.2, 309.3, 313; 4/615; 239/282, 239/283; D23/263
See application file for complete search history.

(56) References Cited

U.S. PATENT DOCUMENTS

| | | | | |
|---|---|---|---|---|
| 195,761 | A * | 10/1877 | Hickok | 211/100 |
| 908,751 | A * | 1/1909 | Cooke | 248/224.8 |
| 1,565,118 | A * | 12/1925 | Stugard | 211/96 |
| 1,596,075 | A * | 8/1926 | Buswell | 119/446 |
| 1,809,317 | A * | 6/1931 | Snyder | 160/349.1 |
| 2,276,779 | A * | 3/1942 | Isenberg | 248/206.1 |
| 2,608,843 | A * | 9/1952 | Kennedy | 141/340 |
| 3,182,946 | A * | 5/1965 | Dudko | 248/292.14 |
| 3,521,332 | A * | 7/1970 | Kramer | 248/229.26 |
| 4,580,751 | A * | 4/1986 | Panzer | 248/205.8 |
| 4,964,573 | A * | 10/1990 | Lipski | 239/283 |
| 6,186,415 | B1 * | 2/2001 | Sanders | 239/282 |
| 6,308,923 | B1 * | 10/2001 | Howard | 248/205.5 |

FOREIGN PATENT DOCUMENTS

EP 0589931 B1 * 12/1992

* cited by examiner

*Primary Examiner*—Korie Chan
(74) *Attorney, Agent, or Firm*—I. Zborovsky

(57) ABSTRACT

A device for holding shower accessories has an attaching element formed as a vacuum attaching element and having an axis, the attaching element being attachable to a surface in a plurality of positions by turning the attaching element around its axis, a holding element connected with the attaching element and pivotable between an operative position in which one end of the holding element applies a pressure on the attaching element and causes the attaching element to be vacuum attached to the surface and an inoperative position in which the holding element is turned relative to the attaching element from the operative position, the holding element having another end which is opposite to the end applying pressure to the attaching element, the opposite end being provided with a tubular channel having a second axis extending transversely to the first axis of the attaching element and formed so as to receive a shower accessory turnably around the second axis, so that the shower accessory can be spatially oriented by turning the attaching element about the first axis and turning the shower accessory in the tubular channel around the second axis.

3 Claims, 5 Drawing Sheets

VIEW A

DEVICE FOR HOLDING SHOWER ACCESSORIES

BACKGROUND OF THE INVENTION

The present invention relates to a device for holding shower accessories,

Devices of the above mentioned general type are known in the art. It is believed that the existing devices can be further improved.

SUMMARY OF THE INVENTION

Accordingly, it is an object of the present invention to provide a device for holding shower accessories which avoids the disadvantages of the prior art.

In keeping with these objects and with others which will become apparent herein after, one feature of the present invention resides, briefly stated in a device for holding shower accessories which has an attachment element to be attachable to a supporting surface and operating on a vacuum principle; and a holding element which is movable relative to said attachment element between an operative position in which it applies a pressure of said attachment element and therefore provides an attachment on said attachment element to the surface and an inoperative position in which said holding element does not apply pressure to said attachment element and therefore said attachment element can be removed from the surface, said attachment element including a first end adapted to abut against said attachment element and a second end provided with an elongated tubular channel.

When the device is designed in accordance with the present invention it allows supporting various shower accessories in a reliable and convenient way in any specially oriented position.

BRIEF DESCRIPTION OF THE DRAWINGS

FIGS. 4 and 5 are a plan view and a side view of a further modification of the inventive device for holding shower accessories in.

DESCRIPTION OF THE PREFERRED EMBODIMENTS

Figure 1:
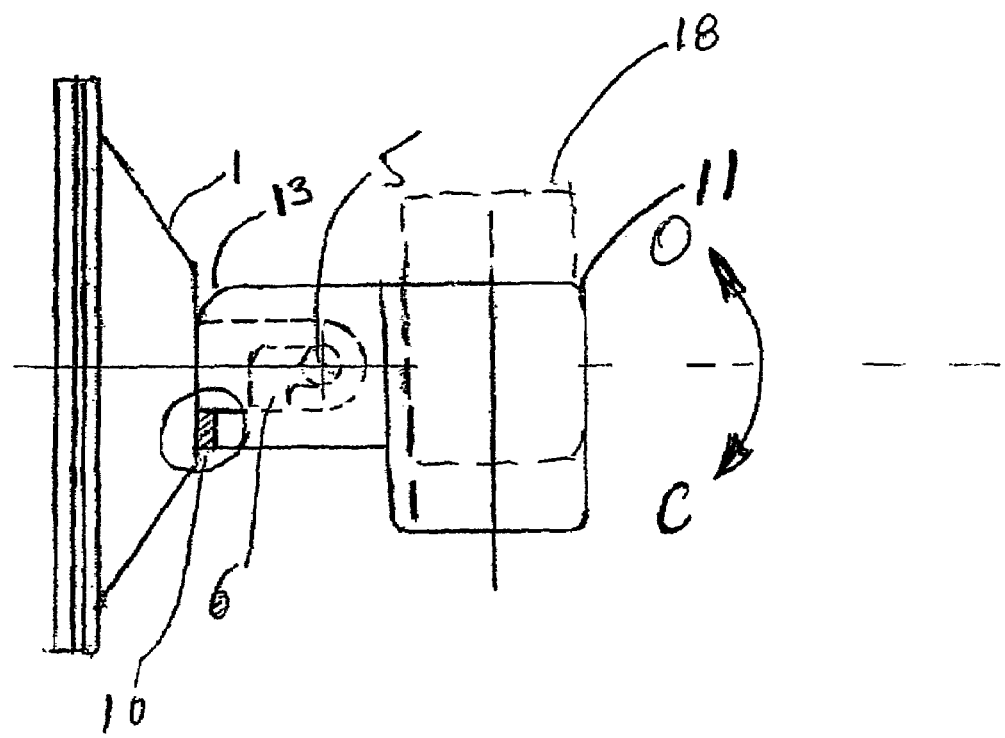
FIGS. 1 and 2 are a side view and a plan view of a device for holding shower accessories in accordance with the present invention.

A device for holding shower accessories in accordance with the present invention has an attachment element which is identified as a whole with reference numeral 1 and is formed as a vacuum attachment element. Such vacuum attachment elements are known in the art. An attachment element 1 has an inner elastic member 2 composed for example of rubber or plastic and an insert 3. A rod 4 is engaged with the insert 3 and has a throughgoing opening 5 and a substantially circular groove 6. The groove 6 serves for connection of the vacuum attachment element 1 with a holding element 7.

The holding element 7 has side walls 8 and 9 with small projections engaging in the opening 5 and forming an axle for turning the holding element 7 relative to the attachment element 1. The walls have a rounded portion 13 and are connected with one another at one side by a partition 10 which serves for locking of an operative position of the holding element 7.

The end of the holding element 7 which is opposite to the end located close to the vacuum element 1 is provided with a tubular channel 11 having an axis AA. The tubular channel 11 which is formed by portions of the holding element 7 has a part of its periphery identified with reference numeral 12 which is open along the tubular channel or in other words along its axis.

Figure 6:
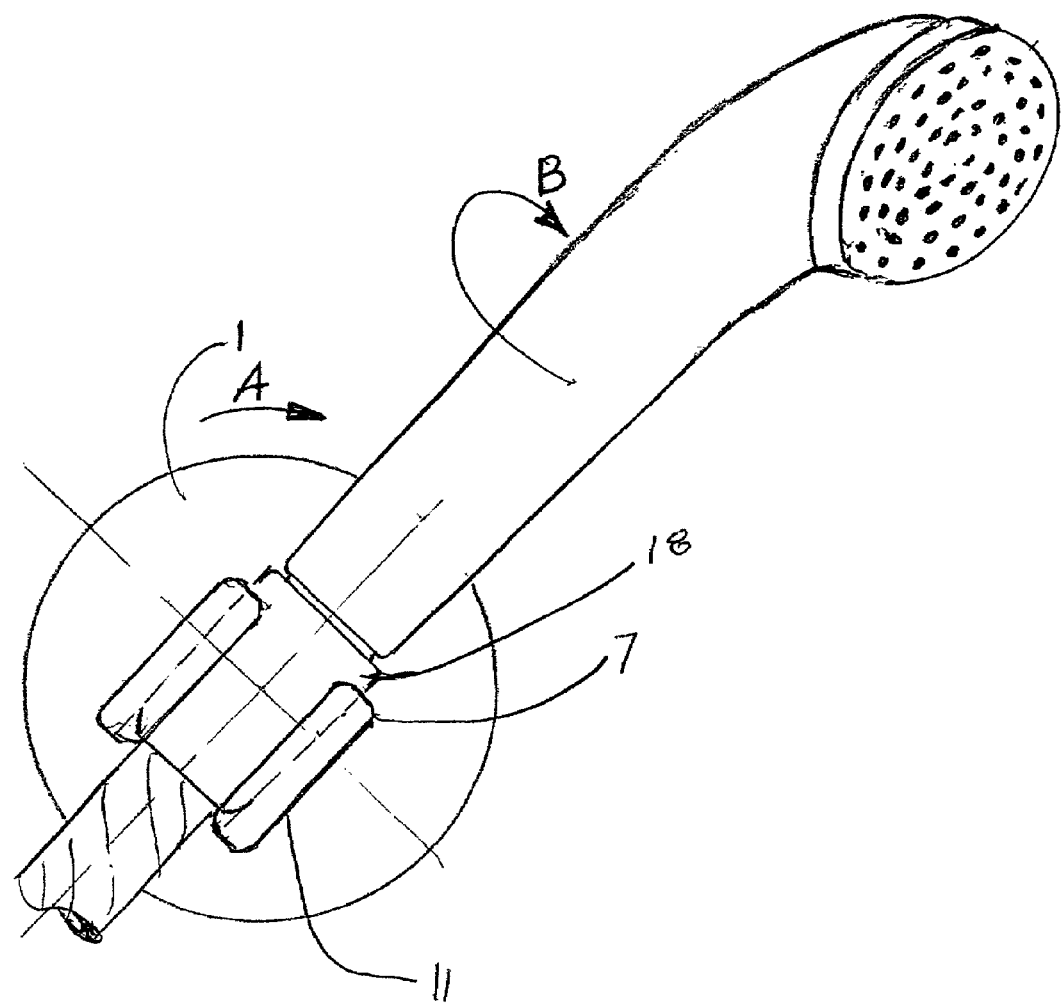
FIG. 6 is a perspective view of the device of FIGS. 4 and 5 with a showerhead held by the device.

The device operates in the following manner:

The attachment element 1 is placed with its elastic member 2 against a surface for attachment, and the holding element 1 is turned to a position shown in FIG. 1 so that with the side walls 8, 9 and rounding 13 which serve as a cam, through the rod 4 and the insert 3 connected with the elastic member 2 a vacuum is formed in the attaching element 1 and the latter is attached to the surface. As shown in FIG. 6 a corresponding accessory, for example a shower head is placed inside the tubular channel 11 and held in the holding element 3. By turning of the attaching element 1 in direction of the arrow A it can be installed in any position on the surface around the axis of the attachment element A. The device, for example the showerhead 18 can be turned inside the channel 11 around the axis of the channel. Therefore the shower accessory can be arranged in any spacial orientation due to the possibility of turning of the corresponding parts relative to two mutually perpendicular axis in particular the axis of the attaching element 1 and the axes, of the tubular channel 11 of the holding element 7.

Figure 2:
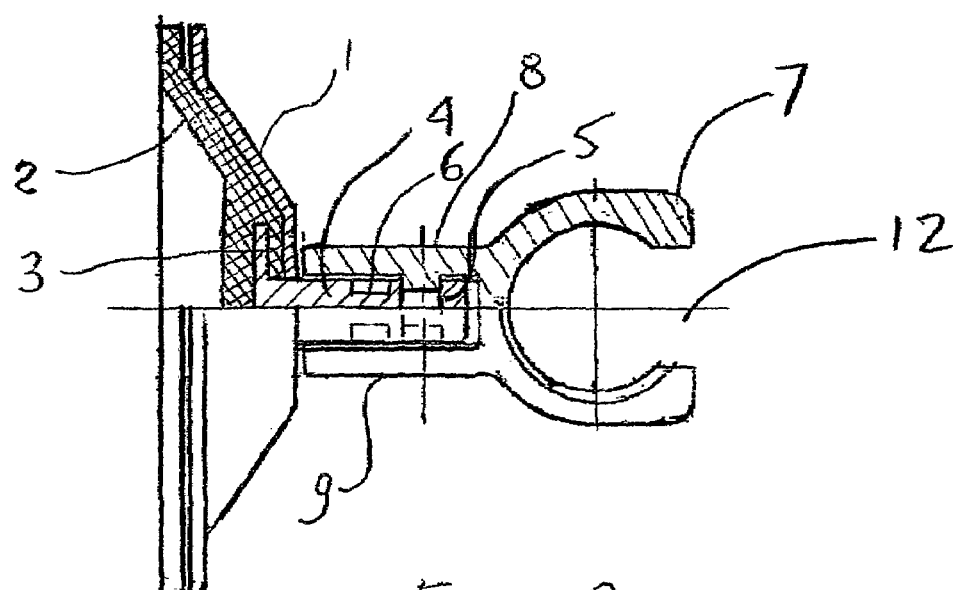
Figure 3:
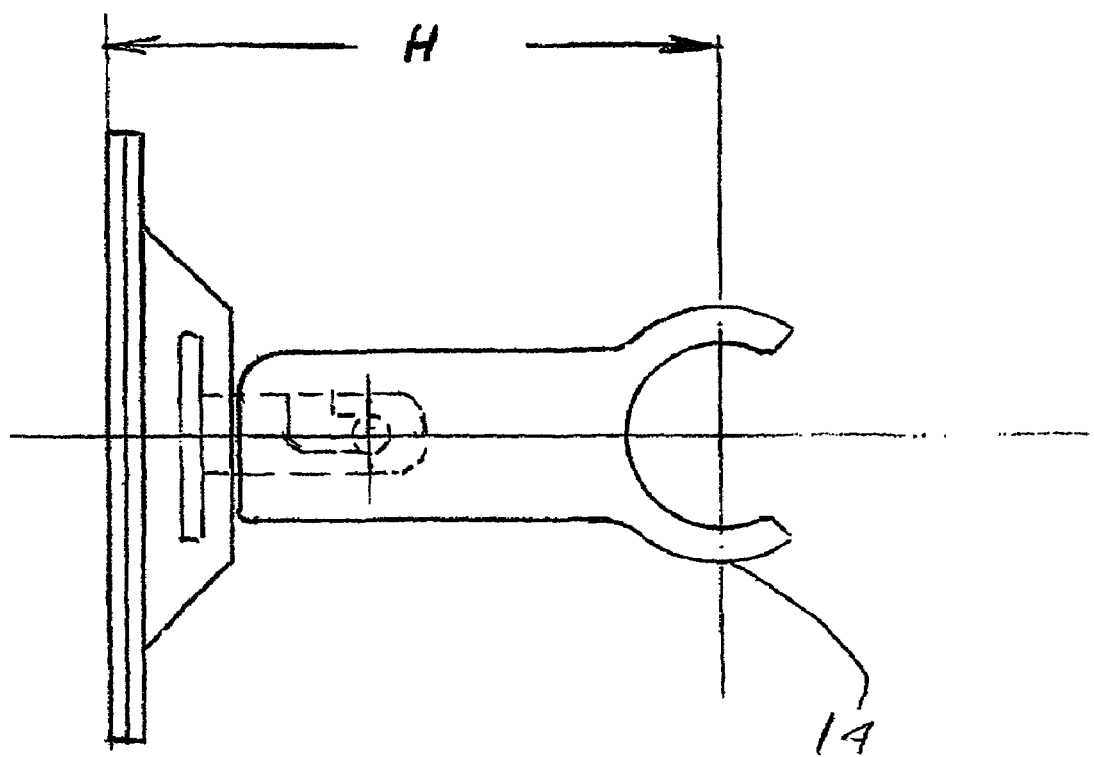
FIG. 3 is a view showing a further modification of the inventive device.

FIG. 3 shows the device which is similar to the device of FIGS. 1 and 2 having a holder 14. It can be used in various combinations, for example for holding a towel bar or a shower bar.

Figure 4:
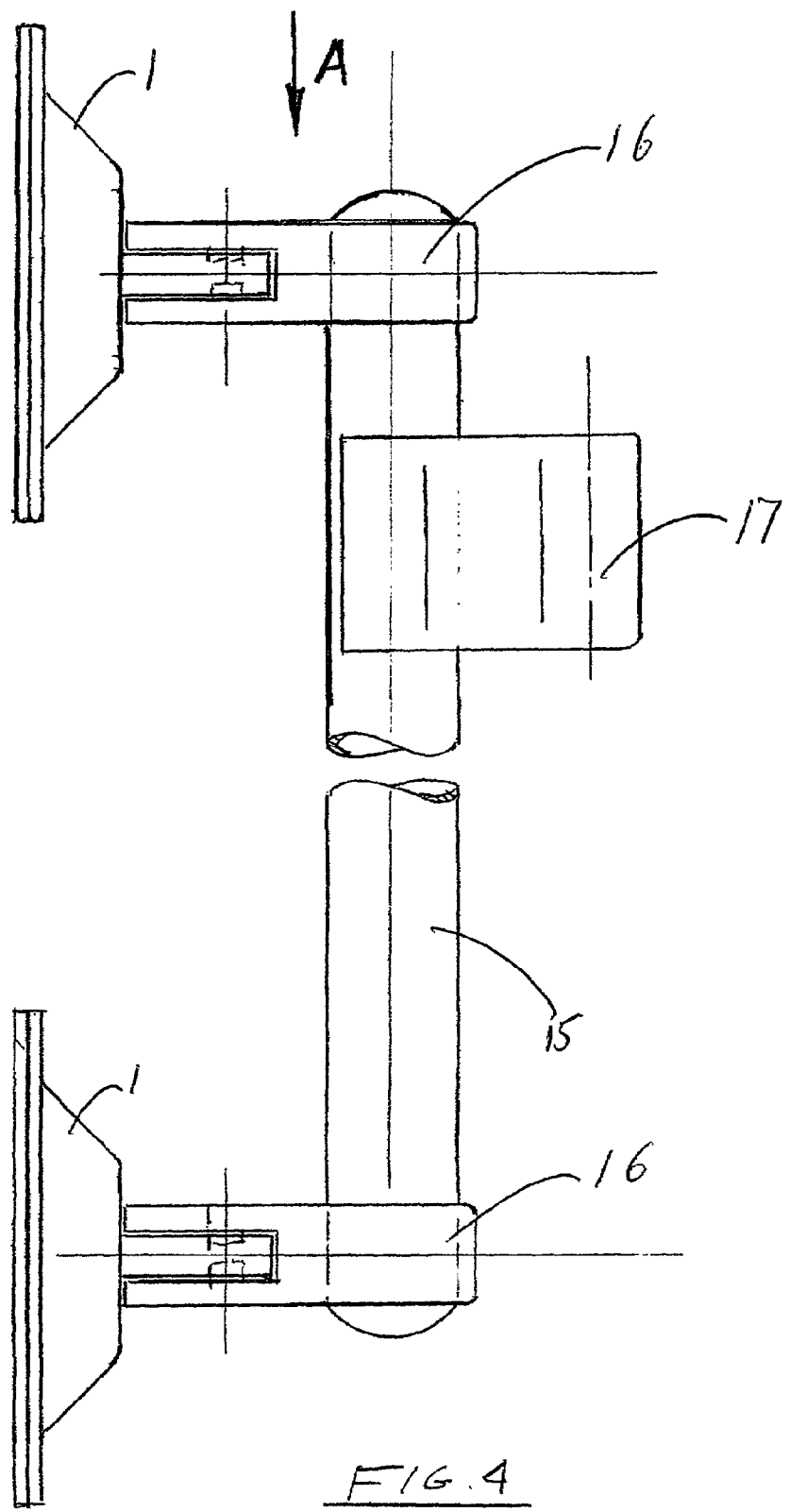
Figure 5:
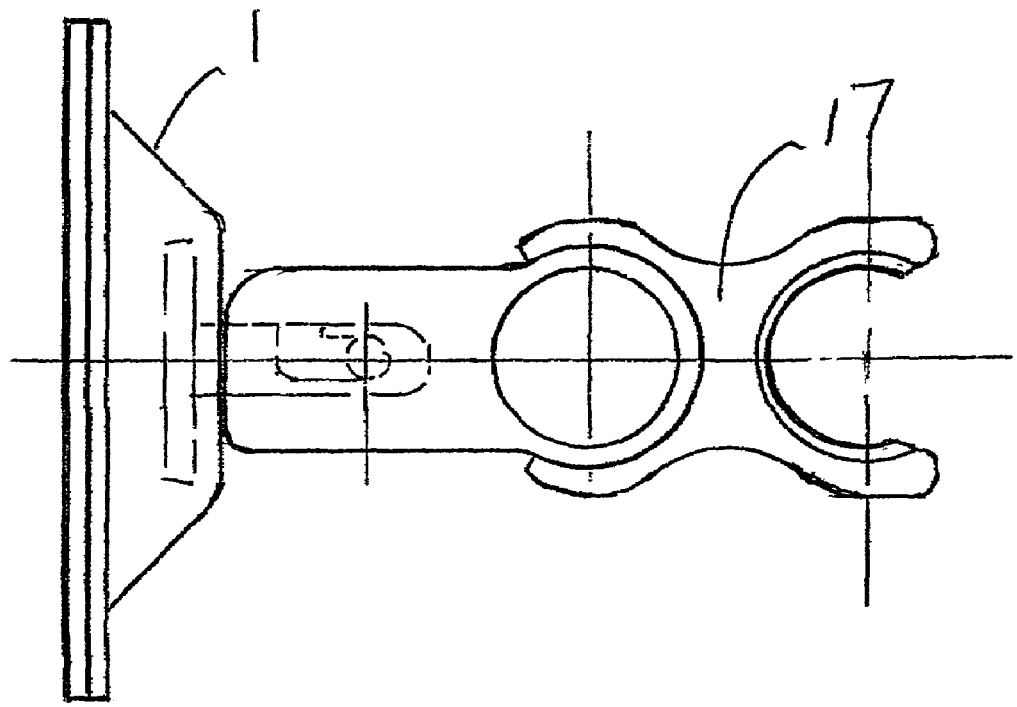

FIGS. 4 and 5 are views showing another modification of the inventive device. Here the device has two attaching elements 1 and two holding elements 7' connected to the attaching elements 1. The attaching elements 1 with the holding elements 7' are spaced from one another in an axial direction, or in other words in direction of the axis of the tubular channels 11'. Here the tubular channels 11' in contrast to the tubular passage 11 of the first embodiment, are peripherally closed. A bar-shaped 15 is inserted in two tubular channels 11" and therefore held in the two holding elements 7'. The bar-shaped element 15 can be used for example as a towel bar. As can be seen from FIG. 4 the axis of the bar-shaped element 15 extends substantially parallel to the pivot axes of the holding elements 7'.

In this construction one displacement of the bar 15 causes turning of the holding elements 7' between their operative position and inoperative position.

An additional holding element 17 is arranged slidably on the bar-shaped element 15. The additional holding element 17 can have a first peripherally open tubular portion 18 with which it can be held on the bar-shaped element 15, for example slidably, and tightly retained on it and another opposite portion 19 which has a further peripherally open tubular passage. The peripherally open tubular passage of the portion 19 of the additional holding element 17 can be used for holding a shower accessory for example the shower bar.

The walls of the holding elements 7, 7' which form tubular passages 11, 11' can be rigid, so that the corresponding accessories can be inserted axially in the tubular passages. On the other hand, these walls can be also somewhat elastic, so that the corresponding accessories can be pushed through the open peripheral part of the tubular channels.

The tubular channels 11, 11' described herein above are generally tubular channels and can have a cylindrical inner surface. On the other hand they also can have a conical inner surface, so that a shower attachment inserted in the tubular channel with a conical inner surface, is reliably held in the conical tubular channel. The conicity of the tubular channel reduces the inner diameter of the tubular channel from one axial end of the tubular channel to the other.

It will be understood that each of the elements described above, or two or more together, may also find a useful application in other types of constructions differing from the types described above.

While the invention has been illustrated and described as embodied in device for holding shower accessories, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for holding accessories, comprising an attaching element formed as a vacuum attaching element and having a first axis; a holding element having a first part formed so as to act on said attaching element and cause said attaching element to be attached to the surface and a second part formed as a substantially tubular channel having a second axis extending transversely to said first axis of said attaching element and formed so as to receive an accessory turnably around said second axis, so that when said holding element is pivoted from an inoperative position to an operative position, said first part of said holding element acts on said vacuum attaching element to attach said vacuum attaching element to the surface and at the same time said substantially tubular channel is oriented along said second axis, so that said accessory can be spatially oriented by turning said attaching element about said first axis and turning said accessory in said substantially tubular channel around said second axis; and means for pivotally connecting said holding element to said attaching element and including an opening provided in one of said elements and two projections extending inwardly from side walls of the other of said elements and engaging in said opening so as to form an axle for turning said holding element relative to said attachment element.

2. A device as defined in claim 1; and further comprising a second such attaching element formed as a vacuum attaching element and also attachable to the surface in a plurality of positions by turning said second attaching element around said first axis; a second holding element connected with said second attaching element and pivotable between an operative position in which one end of said second holding element applies a pressure on said second attaching element and causes said second attaching element to be attached to the surface and an in operative position in which said second holding element is turned relative to said second attaching element from said operative position, said second holding element also having another end which is opposite to said end applying pressure to said second attaching element, said opposite end of said second holding element being also provided with a tubular channel; and means for simultaneously attaching said two attaching elements to the surface by simultaneously pivoting said two holding elements to said operative position and including a single additional element which is held by said two holding elements in said tubular channels of said other ends and which turns said two holding elements simultaneously to said operative position so that one ends of said two holding elements simultaneously apply a pressure to said two attaching element and cause said two attaching elements to simultaneously attach to a surface.

3. A device as defined in claim 1, wherein said attaching element has a groove configured for connecting of said attaching element to said holding element during assembly.

* * * * *